US012761734B2

(12) United States Patent
Hein et al.

(10) Patent No.: US 12,761,734 B2
(45) Date of Patent: Oct. 13, 2026

(54) CUSTOMIZABLE HAPTIC BUTTON INTERFACE

(71) Applicant: Honda Motor Co., Ltd., Tokyo (JP)

(72) Inventors: Amy M. Hein, Columbus, OH (US); James Scott Robinson, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/042,178

(22) Filed: Jan. 31, 2025

(65) Prior Publication Data

US 2026/0227858 A1 Aug. 6, 2026

(51) Int. Cl.

*G06F 3/01* (2006.01)
*B60K 35/10* (2024.01)
*B60K 35/25* (2024.01)

(52) U.S. Cl.

CPC .............. *G06F 3/016* (2013.01); *B60K 35/10* (2024.01); *B60K 35/25* (2024.01); *B60K 2360/151* (2024.01)

(58) Field of Classification Search

None
See application file for complete search history.

(56) References Cited

U.S. PATENT DOCUMENTS 8,836,643 B2 9/2014 Romera Joliff et al.
9,760,175 B2 9/2017 Scheufler et al.
10,126,928 B2 11/2018 Gibson
10,434,879 B2 10/2019 Vassily et al.
2011/0304550 A1* 12/2011 Romera Jolliff ........ G06F 3/016 715/810
2013/0166046 A1 6/2013 Kubota
2013/0215029 A1* 8/2013 Comer, Jr. ............ G06F 3/0393 345/161

(Continued)

FOREIGN PATENT DOCUMENTS

DE 102009052928 A1 5/2011
DE 102011009561 A1 8/2012

(Continued)

OTHER PUBLICATIONS

Candid Technology ("How to Setup a Work Profile on Android? Candid Technology"; Candid Technology; https://www.youtube.com/watch?v=DQLyQKdp9DI; May 2024 hereinafter referred to as "Candid") (Year: 2024).*

(Continued)

*Primary Examiner* — Matthew Yeung
(74) *Attorney, Agent, or Firm* — Plumsea Law Group, LLC

(57) ABSTRACT

A customizable haptic interface for a vehicle having a plurality of systems. An outer surface of the customized haptic interface is configured to be raised to form at least one haptic button that is mapped for input by a user to at least one system of the plurality of systems of the vehicle. In one embodiment, the haptic interface includes a plurality of pins and a frame element configured to hold each pin within a respective opening. The haptic interface also includes an actuator to move the pins within their respective openings in the frame element between a retracted position and a raised position to form the at least one haptic button on the outer surface. The at least one haptic button configured to provide a user input to at least one system of the vehicle.

20 Claims, 10 Drawing Sheets

(56) References Cited

U.S. PATENT DOCUMENTS

| | | | | |
|---|---|---|---|---|
| 2016/0202761 | A1* | 7/2016 | Bostick ................ | G09B 21/004 345/173 |
| 2020/0363925 | A1 | 11/2020 | Lang et al. | |
| 2021/0382558 | A1* | 12/2021 | Strandberg ............. | B60K 35/10 |

FOREIGN PATENT DOCUMENTS

| | | | |
|---|---|---|---|
| DE | 102012004591 | A1 | 10/2012 |
| DE | 102018214385 | A1 | 2/2020 |

OTHER PUBLICATIONS

Volvo University ("Setting up Volve driver profiles"; Volvo University; https://www.youtube.com/watch?v=w6y5xmx5zu4; Sep. 2020I hereinafter referred to as "Volvo"). (Year: 2020).*

* cited by examiner

CUSTOMIZABLE HAPTIC BUTTON INTERFACE

BACKGROUND

This disclosure relates generally to an input system, and more particularly to a customizable haptic button interface.

Generally, vehicles may be equipped with various types of user inputs or user interfaces, such as center console interfaces, touchscreen interfaces, dashboard buttons, knobs, sliders, switches or other types of inputs or interfaces. One or more of these user inputs or user interfaces (UI) may be utilized by a driver, passenger, or other occupant of a vehicle to make various mode selections or enter commands or instructions. For example, a touchpad or touchscreen may be used with a display to facilitate the input of information from the occupants, for example, to control modes or operation of one or more vehicle systems.

Existing touchpads and touchscreens in vehicles require a user to look at the touchpad or touchscreen in order to identify a location of a desired button or input for a function prior to touching. Further, physical, depressible buttons in a vehicle are non-configurable. With an increase in vehicle functions controlled via a central control panel, individual users may be inconvenienced by not being able to select and customize the functions and settings most important to their specific needs.

There is a need in the art for an improved customizable haptic button interface that provides a variety of different user input or user interface functions to allow a user of a vehicle to control different vehicle systems or subsystems.

SUMMARY

In one aspect, a customizable haptic interface for a vehicle having a plurality of systems is provided. The customizable haptic interface includes an outer surface and an actuator. The actuator is operable to cause a portion of the outer surface of the customized haptic interface to be raised to form at least one haptic button that is mapped for input by a user to at least one system of the plurality of systems of the vehicle.

In another aspect, a user interface disposed in a vehicle is provided. The user interface includes a cover layer having an outer surface. The user interface also includes a plurality of pins and a frame element configured to hold each pin of the plurality of pins within a respective opening in the frame element. The user interface also includes an actuator configured to move one or more pins of the plurality of pins within their respective openings in the frame element between a retracted position and a raised position to form at least one haptic button on the outer surface of the cover layer. The at least one haptic button being configured to provide a user input to at least one system of the vehicle.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

A customizable haptic interface for a vehicle is described herein. The techniques of the present embodiments may be used to provide user-configurable, tactile buttons that may be mapped to operate and/or provide input to various vehicle systems or subsystems. Multiple users of the vehicle can configure their own buttons, button configurations, and button arrangements, which may be different for separate vehicle drive modes and user configurations or arrangements may be associated with different user profiles stored in a vehicle. With this arrangement, multiple users of a vehicle are able to customize a haptic interface with one or more tactile buttons configured to their individual needs.

The example embodiments are described herein with reference to a vehicle in the form of a motor vehicle or an automobile. The principles of the example embodiments described herein may be applied to a customizable haptic interface for any type of vehicle that utilizes a user interface for controlling or providing input to one or more systems or subsystems of the vehicle.

Figure 1:
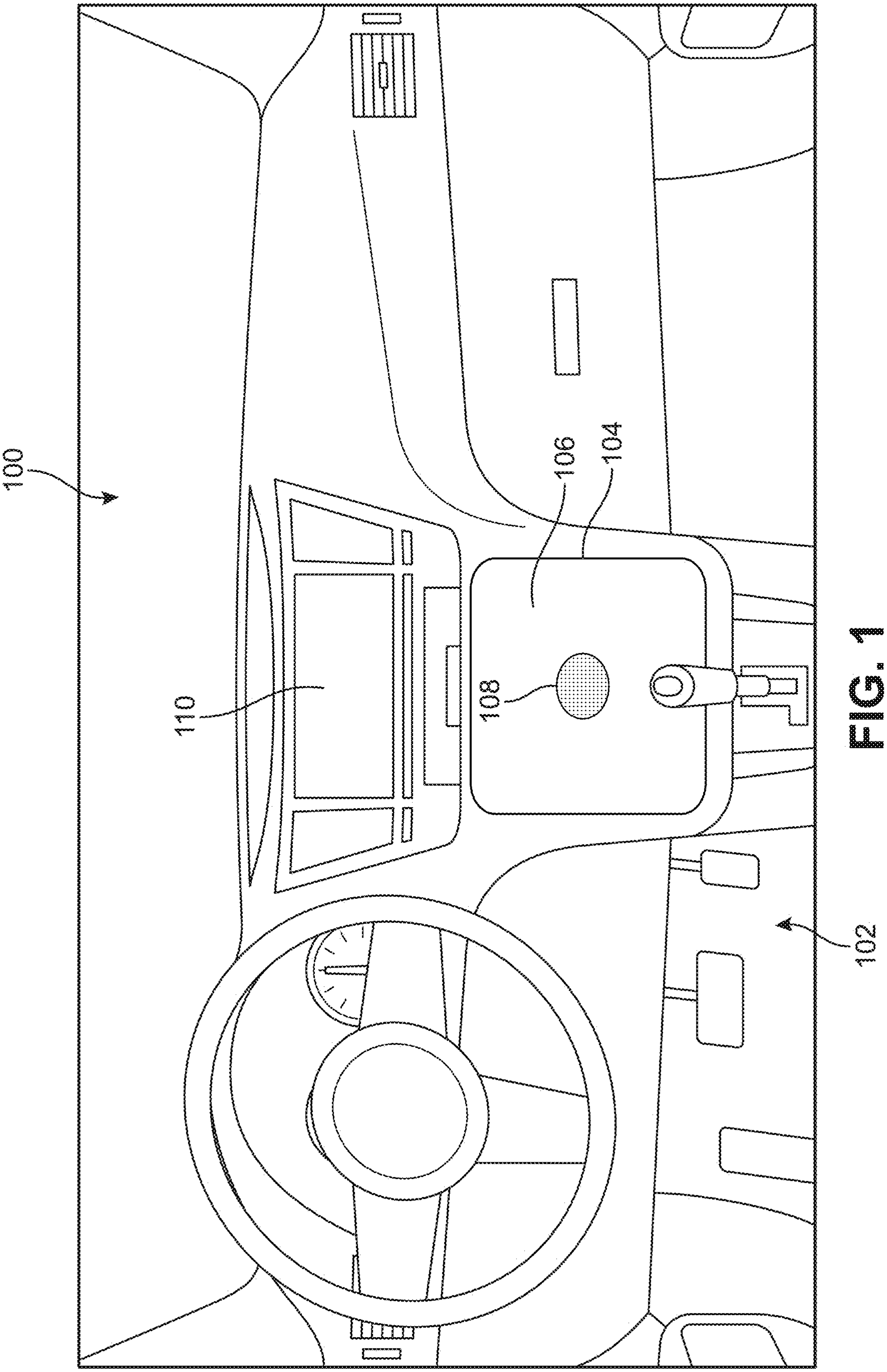
FIG. 1 is a representative view of an example embodiment of an interior of a vehicle that includes a customizable haptic interface in accordance with aspects of the present disclosure.

Referring now to FIG. 1, an interior 102 of a vehicle 100 is shown. In this embodiment, vehicle 100 is an automobile or any type of motor vehicle. In an example embodiment, interior 102 of vehicle 100 may include a customizable haptic interface 104 that allows a user of vehicle 100, such as a driver, passenger, or other occupant, to interface with one or more vehicle systems or subsystems.

In some embodiments, customizable haptic interface 104 includes an outer surface 106 on which one or more haptic buttons 108 may be provided. In this embodiment, outer surface 106 of haptic interface 104 includes one button (e.g., haptic button 108). According to the techniques of the present embodiments, customizable haptic interface 104 is customizable by one or more users of vehicle 100 to change or modify the arrangement of haptic buttons provided on outer surface 106 of haptic interface 104. For example, as will be described in more detail below, the number of haptic buttons, the arrangement of haptic buttons, and/or a mapping between a function associated with each button and one or more systems or subsystems of vehicle 100 may be customized for an individual user through customizable haptic interface 104.

In some embodiments, interior 102 of vehicle 100 may also include a display 110. In an example embodiment, display 110 is separate from customizable haptic interface 104. For example, as shown in FIG. 1, customizable haptic interface 104 is located in a center console or center stack area of interior 102 of vehicle 100 and display 110 is located above customizable haptic interface 104 in a dashboard of vehicle 100. Additionally, while some inputs to customizable haptic interface 104 may cause display 110 to change, customizable haptic interface 104 and display 110 are not synchronized with each other such that every input made by a user through customizable haptic interface 104 is shown on display 110. In other words, customizable haptic interface 104 allows for inputs to systems or subsystems of vehicle 100 without requiring display 110. In some embodiments, display 110 is optional and may be omitted.

Figure 2:
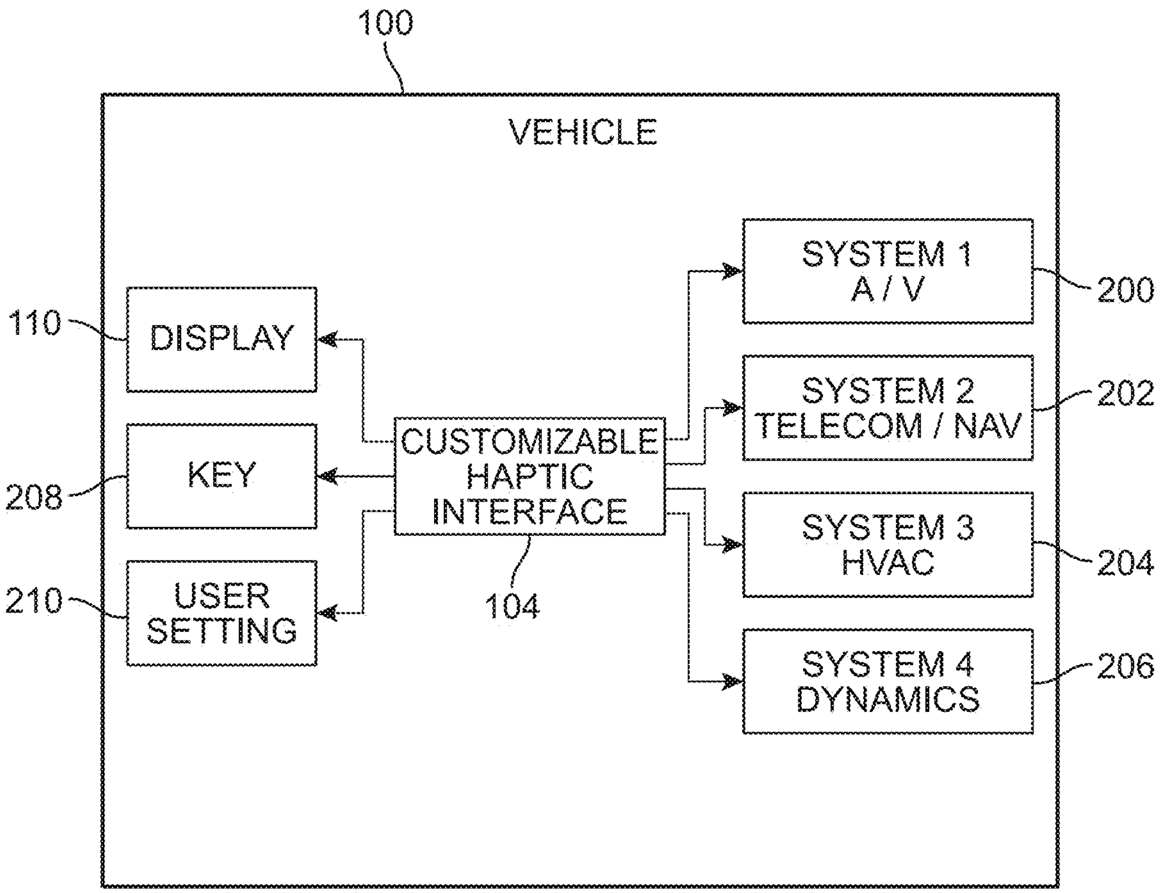
FIG. 2 is a schematic block diagram of an example embodiment of a vehicle that includes a customizable haptic interface in accordance with aspects of the present disclosure.

Referring now to FIG. 2, a block diagram of an example embodiment of vehicle 100 is shown. In some embodiments, haptic interface 104 may allow a user of vehicle 100 to provide an input or selection to one or more systems or subsystems associated with vehicle 100. In an example embodiment, vehicle 100 may include at least one onboard computing system that includes a single computing device or a network of multiple computing devices. In some embodiments, the onboard computing system may be associated with one or more electronic control units (ECUs) of vehicle 100 that control various systems or subsystems of vehicle 100. In one embodiment, the onboard computing system includes at least one processor that includes any type of memory that comprises a non-transitory computer readable medium. In some embodiments, instructions stored within the memory may be executed by the processor to implement the various functions and operations described herein.

In this embodiment, vehicle 100 includes onboard computing systems associated with at least a first system 200, such as an audio/visual system that controls media and music playback as well as other types of video, audio, and entertainment functions, a second system 202, such as a telecommunication or navigation system that controls phone and satellite communications, a third system 204, such as a heating, ventilation, and air conditioning (HVAC) system that controls temperature and airflow within interior 102 of vehicle, and a fourth system 206, such as a vehicle driving dynamics system that controls one or more of motor/engine, transmission, traction control, braking, steering, and other vehicle handling and/or performance functions. It should be understood that the examples of systems 200, 202, 204, 206 are merely exemplary and customizable haptic interface 104 may have buttons mapped to any systems or subsystems of vehicle 100 or any other type of vehicle as would be understood by one of ordinary skill in the art.

In some embodiments, customizable haptic interface 104 may be user-configurable with one or more user profiles and/or mode profiles that are stored for each user. In an example embodiment, customizable haptic interface 104 may change between one or more button arrangements automatically based on a user. For example, in one embodiment, customizable haptic interface 104 may detect a user associated with a key 208. In response, customizable haptic interface 104 may automatically configure into a button arrangement set by the user associated with key 208. Each user that has their own key may have a different default button arrangement set for customizable haptic interface 104 when the user unlocks or starts vehicle 100 using their associated key 208.

In some embodiments, customizable haptic interface 104 may detect a user associated with a user setting 210. In response, customizable haptic interface 104 may automatically configure into a button arrangement set by the user associated with their respective user setting 210. Each user that has their own user setting 210 may have a different default button arrangement set for customizable haptic interface 104. Additionally, key 208 and/or user setting 210 may have multiple user-configured button arrangements for customizable haptic interface 104. For example, a user may select a particular button arrangement from the multiple button arrangements as a default and the other button arrangements may be chosen by the user or may be based on detection of certain preset driving or operational conditions of vehicle 100, such as a vehicle speed or time of day, etc.

Figure 3:
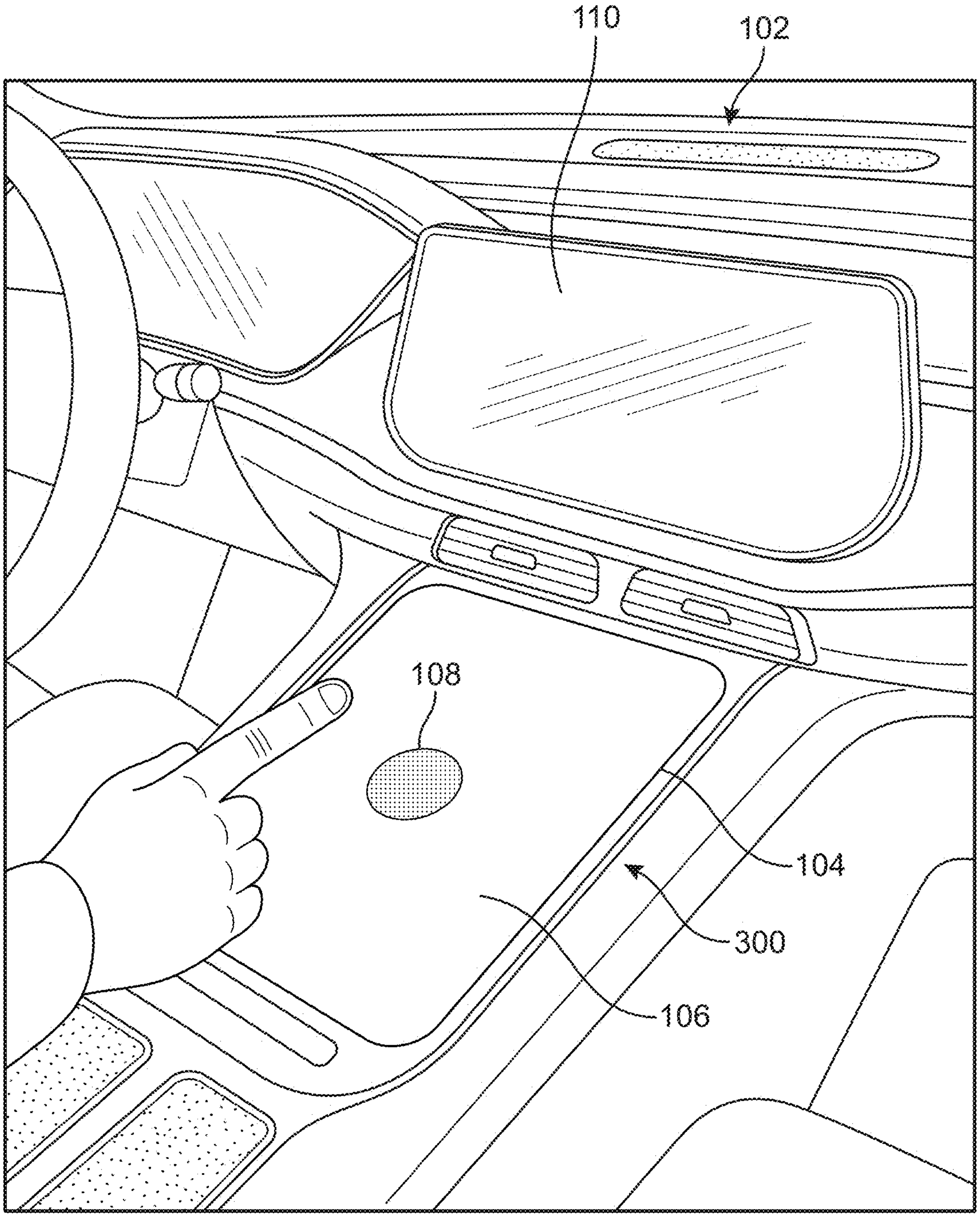
FIG. 3 is a representative view of an example embodiment of a customizable haptic interface with a first button arrangement in accordance with aspects of the present disclosure.

FIG. 3 is a representative view of an example embodiment of customizable haptic interface 104 with a first button arrangement 300. In this embodiment, first button arrangement 300 of haptic interface 104 includes a single haptic button 108 on outer surface 106. Button 108 is formed by a portion of outer surface 106 of haptic interface 104 that is raised above the surrounding portion of outer surface 106 to provide a tactile physical button that may be felt by a finger of a user. That is, a user of vehicle 100 need not look with their eyes at haptic interface 104 to find button 108, but instead may use a hand or finger to feel the raised portion of outer surface 106 of haptic interface 104. In some embodiments, haptic buttons of the present embodiments, including button 108, may provide force feedback in the form of resistance or a clicking sensation to indicate or affirm to a user that the button has been pressed. In this embodiment, first button arrangement 300 of haptic interface 104 includes only one haptic button 108. For example, first button arrangement 300 may be associated with a minimalistic or simple setting where the number of buttons or inputs is limited to a small number in order to minimize the options presented to the user of vehicle 100. As will be described in more detail below, a user may configure haptic interface 104 with any number of haptic buttons and/or inputs using different button arrangements.

Figure 4:
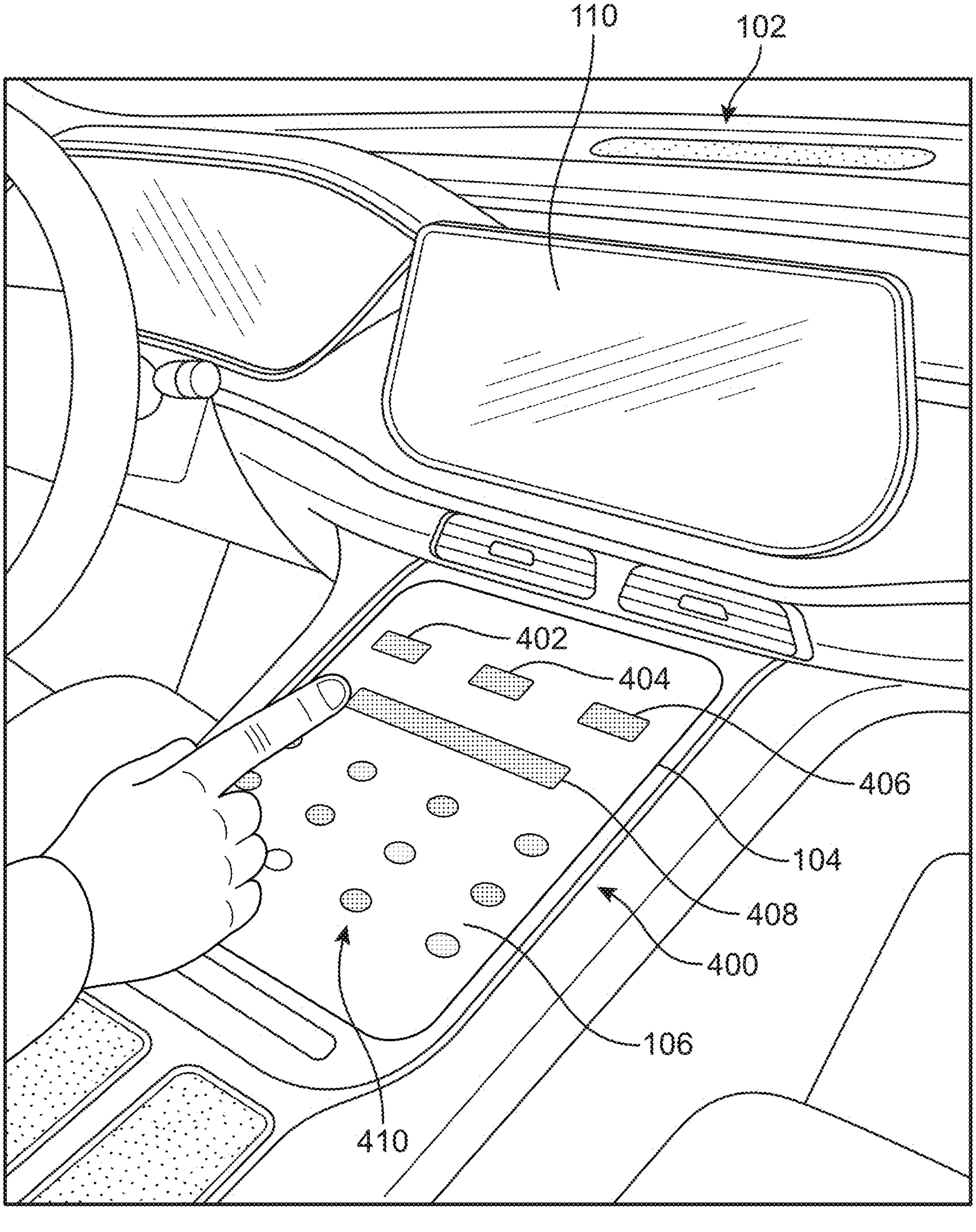
FIG. 4 is a representative view of an example embodiment of a customizable haptic interface with a second button arrangement in accordance with aspects of the present disclosure.

Referring now to FIG. 4, a representative view of an example embodiment of customizable haptic interface 104 with a second button arrangement 400 is shown. In some embodiments, second button arrangement 400 is different from first button arrangement 300 shown in FIG. 3. In this embodiment, second button arrangement 400 of haptic interface 104 includes a plurality of haptic buttons on outer surface 106. As shown in FIG. 4, the plurality of haptic buttons include a first button 402, a second button 404, and a third button 406 disposed along a top of outer surface 106 of haptic interface 104. In this embodiment, first button 402, second button 404, and third button 406 have similar rectangular shapes.

Second button arrangement 400 also includes a fourth button 408 that is located beneath first button 402, second button 404, and third button 406 on outer surface 106 of haptic interface 104. In this embodiment, fourth button 408 is configured as a rectangular slider that receives input from a finger of a user moving along a length of the slider to control various functions or operations of a system or subsystem of vehicle 100. In an example embodiment, the plurality of haptic buttons of second button arrangement 400 also includes a set of round haptic buttons 410. In this embodiment, set of round haptic buttons 410 are located beneath fourth button 408 and include a number of similarly sized round or circular buttons. In one embodiment, set of round haptic buttons 410 may be configured as a keypad or number pad that allows a user of vehicle 100 to easily enter text and/or numbers via haptic interface 104. For example, set of round haptic buttons 410 configured as a keypad and/or number pad may be helpful to permit a user to enter information into a navigation system of vehicle 100.

In this embodiment, the plurality of haptic buttons of second button arrangement 400 includes multiple different shapes and/or sizes of buttons. For example, as shown in FIG. 4, a first group of buttons that includes first button 402, second button 404, and third button 406 has a rectangular shape and a second group of buttons that includes set of round haptic buttons 410 has a round or circular shape that is different from the rectangular shape of the first group of buttons and it also smaller than the first group of buttons. Additionally, other buttons, such as fourth button 408, may have other shapes and/or sizes that are different from the shapes or sizes of the first group or the second group. For example, in this embodiment, fourth button 408 is a slider that is larger and longer than the first group and the second group of buttons. Because customizable haptic interface 104 is user configurable, other sizes and shapes may be selected for buttons as would be obvious to one of ordinary skill in the art.

Figure 5:
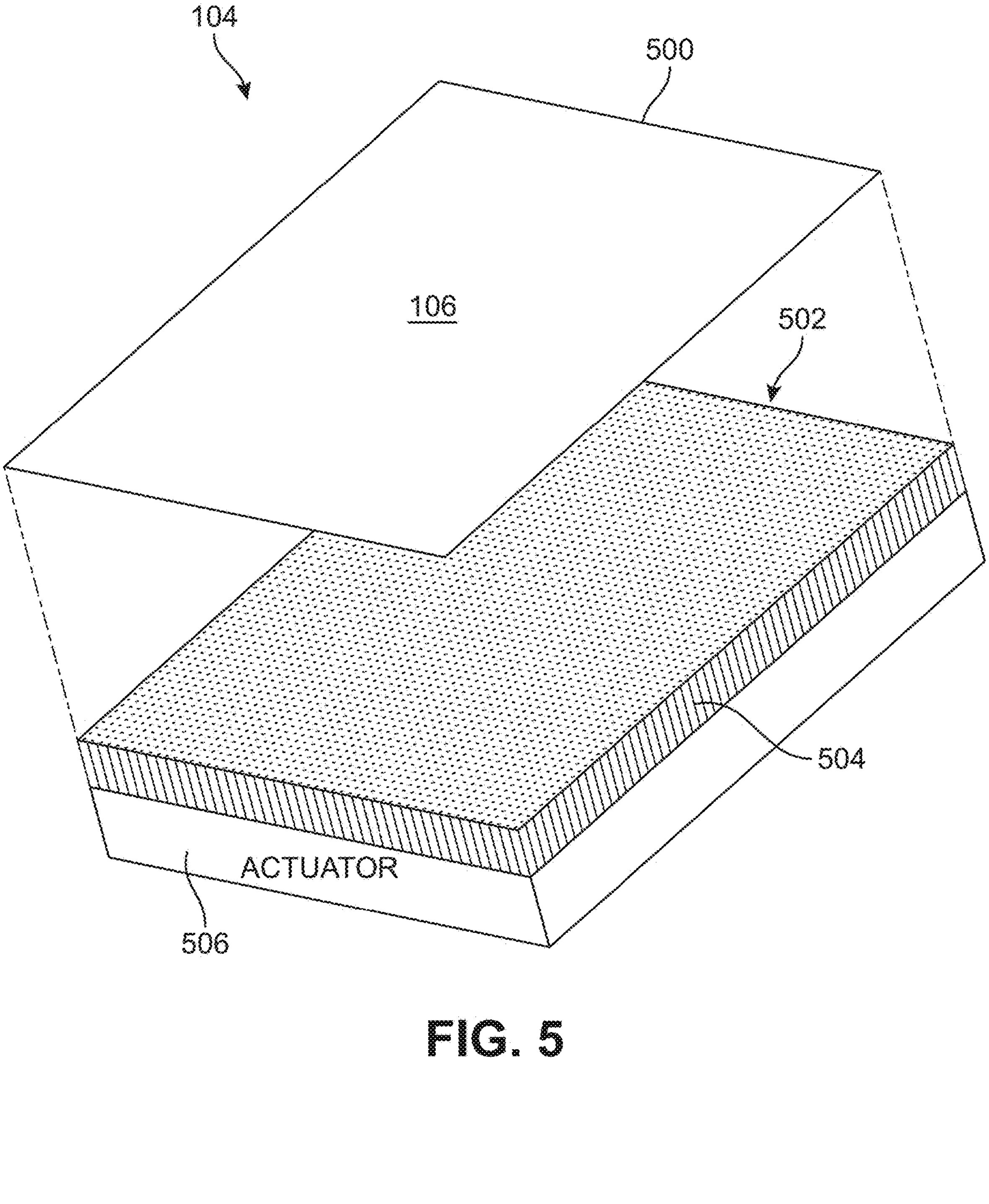
FIG. 5 is a schematic exploded view of an example embodiment of a customizable haptic interface in accordance with aspects of the present disclosure.

Referring now to FIG. 5, a schematic exploded view of an example embodiment of customizable haptic interface 104 is shown. In an example embodiment, haptic interface 106 includes a cover layer 500 having outer surface 106. Cover layer 500 may be made from a thin flexible material that is configured to allow portions and/or areas of cover layer 500 to be raised above outer surface 106 to form one or more of the haptic buttons of haptic interface 104. Haptic interface 104 also includes a plurality of pins 502 that are arranged into a grid or array within a frame element 504. Frame element 504 includes a plurality of holes or openings that each receive a corresponding pin of plurality of pins 502. Each pin of plurality of pins 502 is configured to be slidable or moveable within its respective hole or opening in frame element 504. In some embodiments, cover layer 500 disposed over plurality of pins 500 and frame element 504 also prevents contaminants or debris from interfering with the operation or movement of the pins within their holes or openings in frame element 504. In an example embodiment, pins of plurality of pins 502 may have a diameter in a range from 1 mm to 3 mm. In other embodiments, the size of plurality of pins 502 may be larger or smaller. Additionally, in still other embodiments, plurality of pins 502 may include sets or groups of pins that vary in size from other sets or groups of pins.

In one embodiment, haptic interface 104 also includes an actuator 506 that is located beneath plurality of pins 502 and frame element 504. Actuator 506 is configured to individually actuate one or more pins of plurality of pins 502 within their respective holes or openings in frame element 504 to raise and/or lower the pins to form haptic buttons and/or change the button arrangements on outer surface 106 of haptic interface 104 based on the user's selection. That is, actuator 506 causes portions of outer surface 106 to be raised to form one or more haptic buttons according to a desired button arrangement.

In one embodiment, actuator 506 may be an electromagnetic device and plurality of pins 502 may include at least a portion of magnetically-responsive material such that an electromagnetic force selectively generated by actuator 506 may raise specific pins of plurality of pins 502 within their respective holes or openings in frame element 504 to press against an underside of cover layer 500 to form raised portions of outer surface 106 associated with one or more of the haptic buttons of haptic interface 104. In other embodiments, actuator 506 may utilize other technologies to cause raised portions of outer surface 106 of haptic interface 104 to form haptic buttons, such as microfluidic and/or pneumatic technology.

In some embodiments, haptic interface 104 may further include embedded lighting, such as LEDs or other technology, to visually identify outlines and/or text of individual haptic buttons on outer surface 106 of haptic interface 104 that are configured for a specific user button arrangement. In some embodiments, the lighting and/or text features may be provided via a separate cover overlay on top of cover layer 500 of haptic interface 104.

Figure 6:
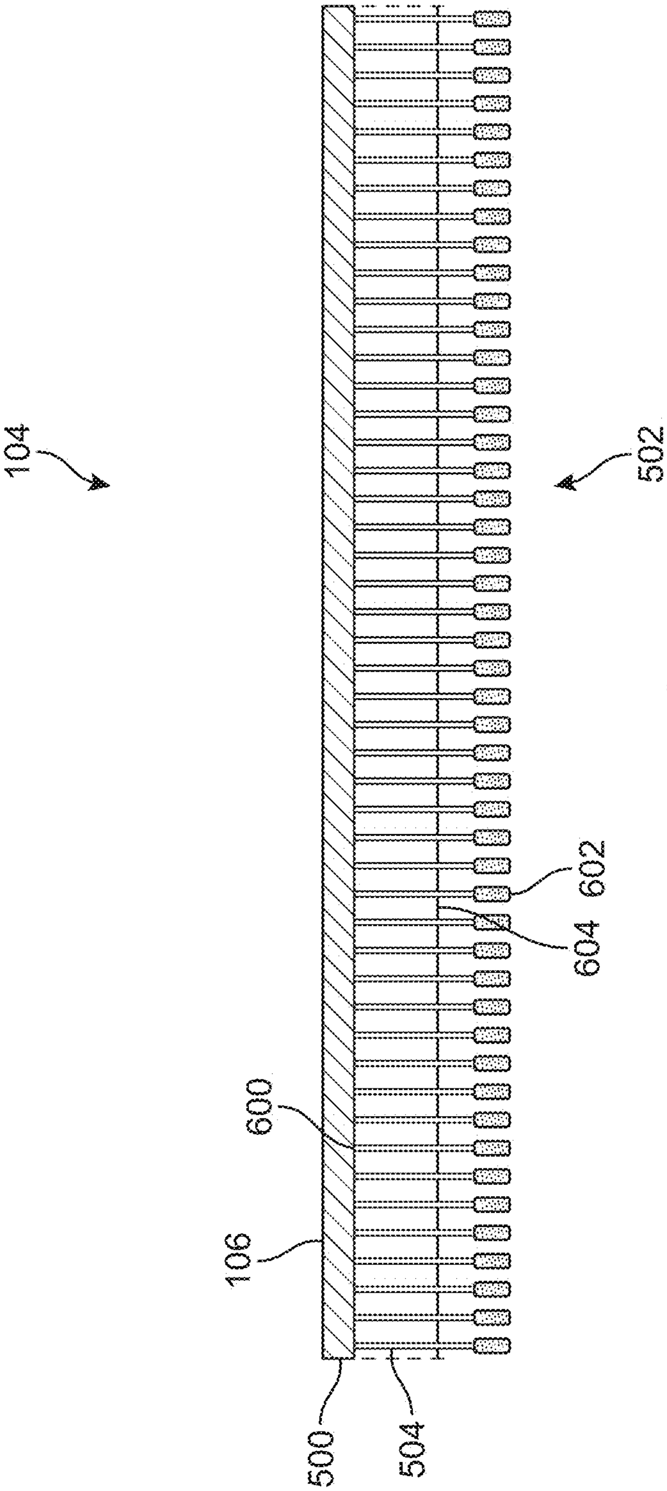
FIG. 6 is a schematic cross-section view of an example embodiment of a customizable haptic interface with a plurality of pins in a retracted position in accordance with aspects of the present disclosure.

FIG. 6 is a schematic cross-section view of an example embodiment of customizable haptic interface 104 with plurality of pins 502 in a retracted position. In this embodiment, plurality of pins 502 are within their respective holes or openings in frame element 504 in a retracted position. In the retracted position, an underside of cover layer 500 is directly adjacent to a top of frame element 504 and each distal end 600 of a pin of plurality of pins 502 is located at or below the top of frame element 504 within its respective hole or opening. Opposite distal end 600 of each pin is a proximal end 602 that is located below or beneath a bottom 604 of frame element 504 in the retracted position.

Figure 7:
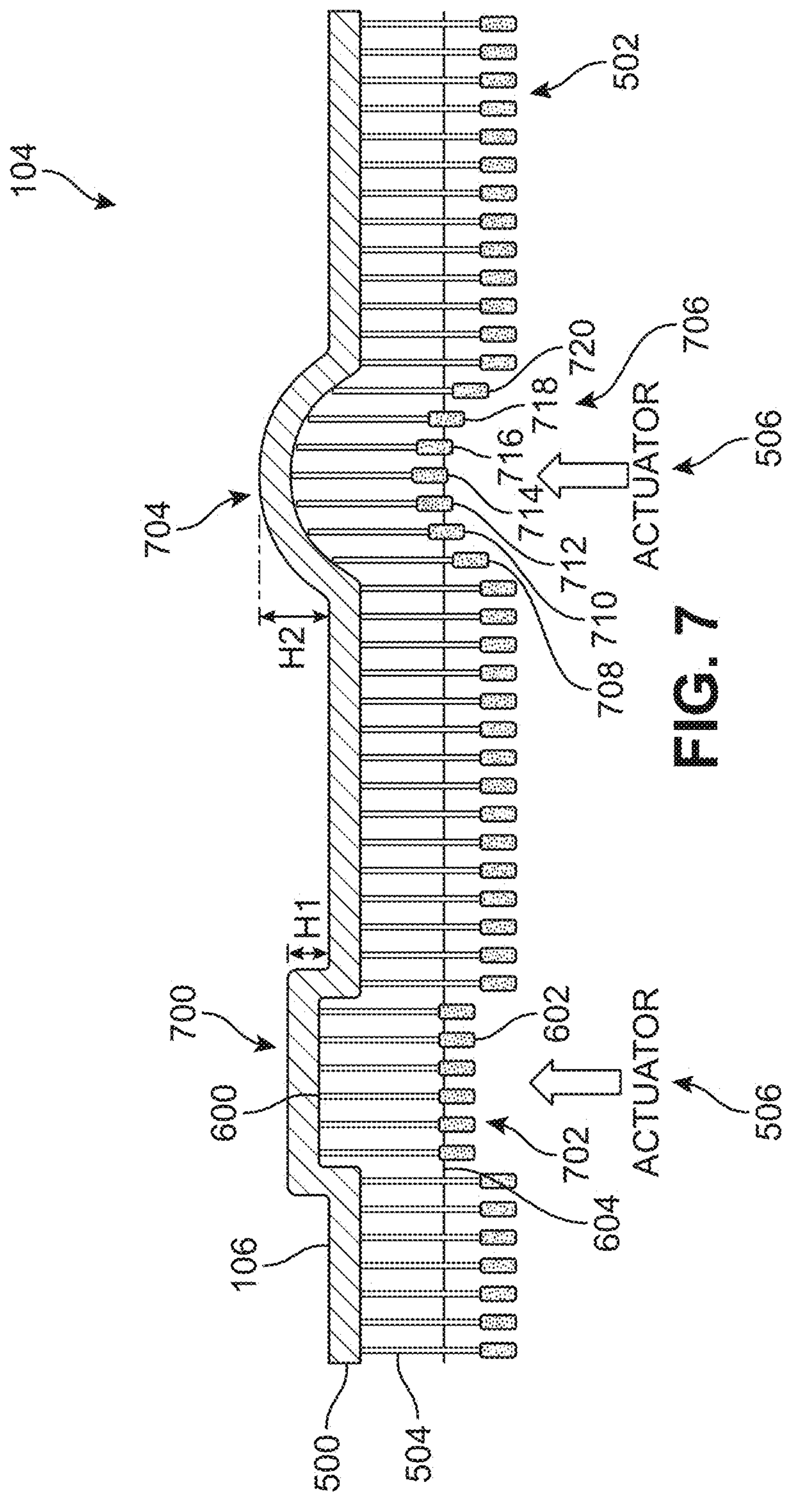
FIG. 7 is a schematic cross-section view of an example embodiment of a customizable haptic interface with groups of pins in raised positions to form haptic buttons in accordance with aspects of the present disclosure.

FIG. 7 is a schematic cross-section view of the example embodiment of customizable haptic interface 104 with groups of plurality of pins 502 in raised positions to form haptic buttons. In this embodiment, haptic interface 104 includes a first haptic button 700 raised on a portion of outer surface 106 by a first group 702 of plurality of pins 502 and a second haptic button 704 raised on a different portion of outer surface 106 by a second group 706 of plurality of pins 502.

As shown in FIG. 7, actuator 506 individually controls the pins of first group 702 to be raised from their retracted positions within holes or openings of frame element 504 to a first raised position. The movement of first group 702 of plurality of pins 502 causes distal ends 600 of each pin to push cover layer 500 upwards above outer surface 106 to a first height H1 to form first haptic button 700. For example, as described above, actuator 506 may use electromagnetic actuation of a portion of each pin, such as proximal end 602 to cause the pins of first group 702 to move from the retracted position to the first raised position as shown in FIG. 7 to form first haptic button 700. In this embodiment, each pin of first group 702 of plurality of pins 502 is raised an equal amount so that first haptic button 700 is uniformly at first height H1 above outer surface 106 of cover layer 500 of haptic interface 104. That is, each pin of first group 702 of plurality of pins 502 moves an amount corresponding to at least first height H1 within its respective hole or opening in frame element 504 to push against the underside of cover layer 500 to create a raised portion of outer surface 106 that forms first haptic button 700. In one embodiment, first height H1 is approximately 3 mm above the non-raised portions of outer surface 106.

In some embodiments, actuator 506 may control the height that each pin of plurality of pins 502 is raised by different amounts. For example, while first haptic button 700 is formed by first group 702 of pins that are uniformly raised by actuator 506 to the same height (e.g., first height H1), second haptic button 704 formed by second group 706 of pins may be raised to variable amounts to form a rounded or domed shape of second haptic button 704.

As shown in FIG. 7, actuator 506 individually controls the pins of second group 706 to be raised from their retracted positions within holes or openings of frame element 504 to a plurality of raised positions. The movement of second group 706 of plurality of pins 502 causes distal ends 600 of each pin to push cover layer 500 upwards above outer surface 106 to a second height H2 to form second haptic button 704. For example, as described above, actuator 506 may use electromagnetic actuation of a portion of each pin, such as proximal end 602 to cause the pins of second group 706 to move from the retracted position to one or more raised positions as shown in FIG. 7 to form second haptic button 704.

In this embodiment, the pins of second group 706 of plurality of pins 502 are raised by different amounts so that second haptic button 704 has a rounded or domed shape that gradually rises to a second height H2 above outer surface 106 of cover layer 500 of haptic interface 104 at a middle or center of second haptic button 704. That is, the pins of second group 706 of plurality of pins 502 move to different heights within their respective holes or openings in frame element 504 to push against the underside of cover layer 500 to create a raised portion of outer surface 106 that forms second haptic button 704.

In this embodiment, second group 706 of pins includes a first pin 708, a second pin 710, a third pin 712, a fourth pin 714, a fifth pin 716, a sixth pin 718, and a seventh pin 720. As shown in FIG. 7, the rounded or domed shape of second haptic button 704 is formed by actuator 506 selectively raising pins 708, 710, 712, 714, 716, 718, 720 to different heights. For example, in this embodiment, first pin 708 and seventh pin 720 are raised by a first amount, second pin 710 and sixth pin 718 are raised by a second amount that is greater than the first amount, and third pin 712, fourth pin 714, and fifth pin 716 are raised by a third amount that is greater than both the first amount and the second amount. As shown in FIG. 7, third pin 712, fourth pin 714, and fifth pin 716 are raised by the third amount so that a middle or center of second haptic button 704 is second height H2 above outer surface 106 of cover layer 500. In one embodiment, second height H2 is approximately 4 mm above the non-raised portions of outer surface 106.

With this arrangement, haptic interface 104 may include one or more buttons on outer surface 106 that have different heights by selectively raising pins of plurality of pins 502 by different amounts. This permits customizable haptic interface 104 to allow a user to create customized haptic buttons with varying heights, shapes, and arrangements to assist the user to feel rather than look at haptic interface 104 while driving.

According to the techniques of the present embodiments, multiple users of vehicle 100 can configure their own haptic button arrangements on customizable haptic interface 104, which may include separate arrangements or configurations for different vehicle drive modes. In some embodiments, user configurations or arrangements may be associated with different user profiles stored in a vehicle and/or associated with a key or user setting (e.g., key 208 and/or user setting 210). In some cases, customizable haptic interface 104 is configurable by entering a setup mode via vehicle 100 itself, or via an application on a mobile device of a user, such as a smart phone or other user device. Options provided to the user for haptic buttons on customizable haptic interface 104 may include a selected number of pre-configured shapes to simplify the setup and configuration process. The shapes can be dragged to a desired location and also resized, and further mapped to a specific vehicle system or subsystem function for control and/or input to the specific vehicle system or subsystem. In some cases, the user may also select a desired height or protrusion of each haptic button in order to obtain a desired topography for customizable haptic interface 104. In some embodiments, customizable haptic interface 104 may include a number of default button arrangements or configurations for a user to select and start customizing, including a blank outer surface 106 for haptic interface 104.

Figure 8:
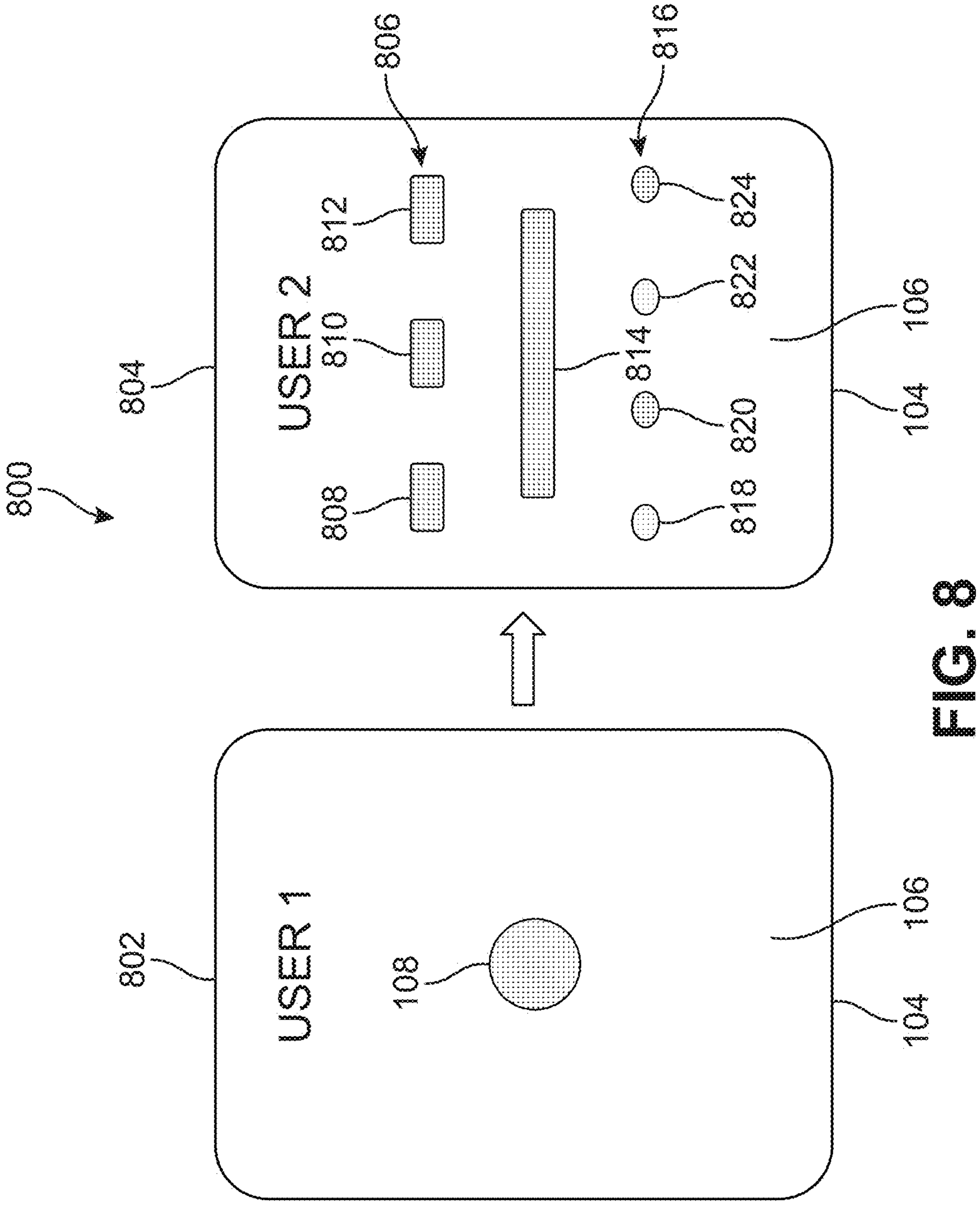
FIG. 8 is a schematic view of examples of user button arrangements for a customizable haptic interface in accordance with aspects of the present disclosure.

Referring now to FIG. 8, examples of user button arrangements 800 for customizable haptic interface 104 are shown. In accordance with the techniques of the present embodiments described herein, each user of vehicle 100 may have one or more customized button arrangements of haptic buttons on haptic interface 104. In this embodiment, a first user has a first button arrangement 802 for haptic interface 104. First button arrangement 802 may be saved in vehicle 100 and/or associated with a key (e.g., key 208) and/or a user setting (e.g., user setting 210) to transition haptic interface 104 to first button arrangement 802 for the first user. As shown in FIG. 8, first button arrangement 802 of the first user for haptic interface 104 includes haptic button 108 on outer surface 106. In this embodiment, first button arrangement 802 of the first user for haptic interface 104 may be associated with a minimalistic or simple setting where the number of buttons or inputs is limited to a small number (e.g., one haptic button 108) in order to minimize the options presented to the first user of vehicle 100.

In this embodiment, a second user has a second button arrangement 804 for haptic interface 104. Second button arrangement 804 may be saved in vehicle 100 and/or associated with a key (e.g., key 208) and/or a user setting (e.g., user setting 210) to transition haptic interface 104 to second button arrangement 804 for the second user. As shown in FIG. 8, second button arrangement 804 of the second user is different from first button arrangement 802 of the first user for haptic interface 104. For example, second button arrangement 804 for the second user includes a first group 806 of buttons, including a first button 808, a second button 810, and a third button 812, a fourth button 814 configured as a slider, and a second group of buttons 816, including a fifth button 818, a sixth button 820, a seventh button 822, and an eighth button 824. In this embodiment, the shape and/or size of the buttons of first group 806 (e.g., buttons 808, 810, 812) are rectangular and are different from the shape and/or size of the buttons of second group 816 (e.g., buttons 818, 820, 822, 824), which are round or circular. In this embodiment, second button arrangement 804 of the second user for haptic interface 104 may be associated with inputs and/or interfaces for multiple systems or subsystems of vehicle 100, compared with the simple interface of first button arrangement 802 of the first user. With this arrangement, customizable haptic interface 104 may be user-configurable for the specific needs or arrangement of each user of vehicle 100.

Figure 9:
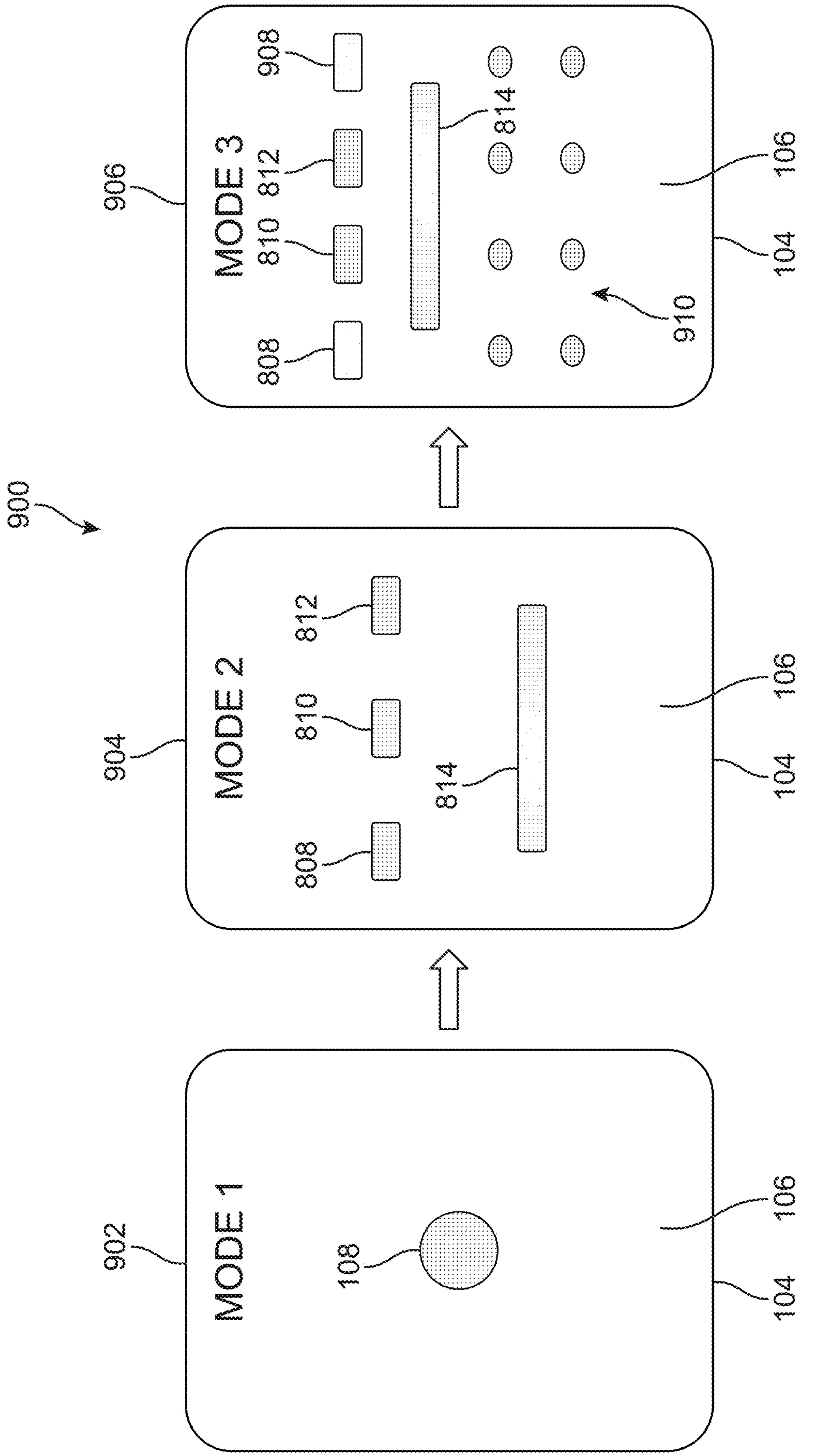
FIG. 9 is a schematic view of examples of mode-specific button arrangements for a customizable haptic interface in accordance with aspects of the present disclosure.

In some embodiments, a user may store or saved multiple button arrangements for customizable haptic interface 104 that may be selected for different types of driving modes for vehicle 100. Referring now to FIG. 9, a schematic view of examples of mode-specific button arrangements 900 for customizable haptic interface 104 is shown. In this embodiment, mode-specific button arrangements 900 include a first mode button arrangement 902, a second mode button arrangement 904, and a third mode button arrangement 906. In an example embodiment, first mode button arrangement 902 for haptic interface 104 may include haptic button 108 on outer surface 106. Second mode button arrangement 904 may include first button 808, second button 810, third button 812, and fourth button 814 configured as a slider on outer surface 106 of haptic interface 104, as described above in reference to FIG. 8. Third mode button arrangement 906 of haptic interface 104 may also include first button 808, second button 810, third button 812, and fourth button 814 configured as a slider from second mode button arrangement 904 and may further include additional haptic buttons, including a fifth button 908 and a plurality of round buttons 910 on outer surface 106.

Each of first mode button arrangement 902, second mode button arrangement 904, and third mode button arrangement 906 may be associated with a different type of driving mode, such as an economy mode, a performance mode, a normal mode, etc., for vehicle 100. The number of buttons on outer surface 106 of haptic interface 104 and the associated mapping to one or more systems or subsystems of vehicle 100, for example, to control or enter inputs to one or more of systems 200, 202, 204, 206 described above in reference to FIG. 2 may be user-configurable for each type of driving mode. With this arrangement, a user of vehicle 100 can customize the layout, number, shape, and function of haptic buttons on outer surface 106 of haptic interface 104 for different types of driving modes or other situations.

Figure 10A:
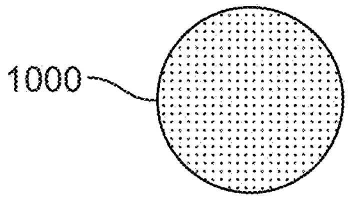
FIG. 10A is a representative view of an example embodiment of a button shape in the configuration of a circle formed by the plurality of pins of the customizable haptic interface in accordance with aspects of the present disclosure.
Figure 10B:
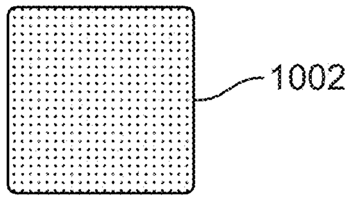
FIG. 10B is a representative view of an example embodiment of a button shape in the configuration of a square formed by the plurality of pins of the customizable haptic interface in accordance with aspects of the present disclosure.
Figure 10C:
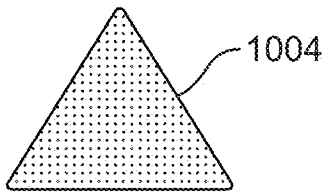
FIG. 10C is a representative view of an example embodiment of a button shape in the configuration of a triangle formed by the plurality of pins of the customizable haptic interface in accordance with aspects of the present disclosure.
Figure 10D:
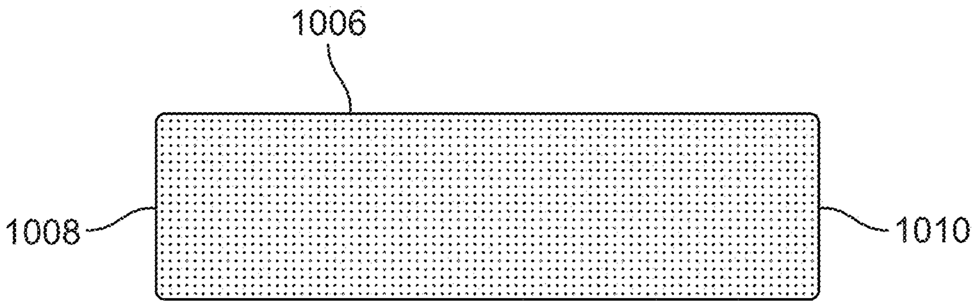
FIG. 10D is a representative view of an example embodiment of a button shape in the configuration of a rectangle formed by the plurality of pins of the customizable haptic interface in accordance with aspects of the present disclosure.

Referring now to FIGS. 10A-10D, examples of shapes of haptic buttons that may be configured on outer surface 106 of haptic interface 104 by movement of plurality of pins 502 by actuator 506 as described above are shown. Referring to FIG. 10A, a representative view of an example embodiment of a button shape in the configuration of a circle 1000 formed by plurality of pins 502 of customizable haptic interface 104 is shown. FIG. 10B is a representative view of an example embodiment of a button shape in the configuration of a square 1002 formed by plurality of pins 502 of customizable haptic interface 104. FIG. 10C is a representative view of an example embodiment of a button shape in the configuration of a triangle 1004 formed by plurality of pins 502 of customizable haptic interface 104. FIG. 10D is a representative view of an example embodiment of a button shape in the configuration of a rectangle 1006 formed by plurality of pins 502 of customizable haptic interface 104.

In this embodiment, rectangle 1006 may be configured a slider input that includes a first end 1008 and a second end 1010. A user may adjust a parameter of a system or subsystem using slider input 1006 between a minimum value or amount associated with first end 1008 and a maximum amount associated with second end 1010. For example, slider input 1006 may be configured in one embodiment to control a volume of audio-visual system 200 (shown in FIG. 2) by moving a finger towards first end 1008 to lower the volume and towards second end 1010 to raise the volume. Other systems or subsystems of vehicle 100 may be similarly controlled using slider input 1006 or variations thereof on haptic interface.

It should be understood that the shapes shown in FIGS. 10A-10D are merely exemplary and other shapes may be formed using plurality of pins 502 as would be known to one of ordinary skill in the art. Additionally, more detailed shapes or designs may be provided on outer surface 106 of haptic interface 104 by using pins of plurality of pins 502 that have a smaller diameter. For example, a diameter of 1 mm for pins of plurality of pins 502 allows shapes with more fine details than shapes formed by pins having a diameter of 3 mm.

Reference in the specification to “one embodiment” or to “an embodiment” means that a particular feature, structure, or characteristic described in connection with the embodiments is included in at least one embodiment. The appearances of the phrase “in one embodiment” or “an embodiment” in various places in the specification are not necessarily all referring to the same embodiment.

While various embodiments of the disclosure have been described, the description is intended to be exemplary, rather than limiting and it will be apparent to those of ordinary skill in the art that many more embodiments and implementations are possible that are within the scope of the disclosure. It is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims. Accordingly, the disclosure is not to be restricted except in light of the attached claims and their equivalents. Also, various modifications and changes may be made within the scope of the attached claims.

The invention claimed is:

1. A customizable haptic interface for a vehicle having a plurality of systems comprising:

an outer surface;

an actuator;

wherein the actuator is operable to cause a portion of the outer surface of the customized haptic interface to be raised to form at least one haptic button that is mapped for input by a user to at least one system of the plurality of systems of the vehicle;

wherein the outer surface is configured to transition between at least a first button arrangement including the at least one haptic button and a second button arrangement including two or more haptic buttons, wherein the first button arrangement is different from the second button arrangement;

wherein the first button arrangement and the second button arrangement are associated with different driving modes of the vehicle; and wherein the first button arrangement includes a fewer number of haptic buttons than the second button arrangement.

2. The customizable haptic interface according to claim 1, wherein the first button arrangement is assigned as a default button arrangement.

3. The customizable haptic interface according to claim 1, wherein the first button arrangement is associated with a first user of the vehicle.

4. The customizable haptic interface according to claim 3, wherein the second button arrangement is associated with a second user of the vehicle that is different from the first user.

5. The customizable haptic interface according to claim 4, further comprising a user profile stored in the vehicle for each of the first user and the second user; and wherein the user profile for the first user includes the first button arrangement and the user profile for the second user includes the second button arrangement.

6. The customizable haptic interface according to claim 5, wherein the user profile for each user is associated with a key and/or a user setting.

7. The customizable haptic interface according to claim 5, wherein the first button arrangement is user-configurable by the first user, including one or more of a button location on the outer surface, a button input mapped to a system of the plurality of systems of the vehicle, and a button shape.

8. The customizable haptic interface according to claim 1, wherein one of the first button arrangement and the second button arrangement are selected based on detection of preset driving or operational conditions of the vehicle.

9. The customizable haptic interface according to claim 1, wherein the first button arrangement includes the at least one haptic button that is mapped for input to a first system of the plurality of systems of the vehicle; and wherein the second button arrangement includes at least one haptic button that is mapped for input to a second system of the plurality of systems of the vehicle, wherein the second system is different from the first system.

10. The customizable haptic interface according to claim 9, wherein the second button arrangement further includes at least one group of haptic buttons that are mapped for input to a third system of the plurality of systems of the vehicle, wherein the third system is different from the second system and the first system.

11. A user interface disposed in a vehicle, comprising:

a cover layer having an outer surface;

a plurality of pins;

a frame element configured to hold each pin of the plurality of pins within a respective opening in the frame element; and an actuator configured to move one or more pins of the plurality of pins within their respective openings in the frame element between a retracted position and a raised position to form at least one haptic button on the outer surface of the cover layer, the at least one haptic button being configured to provide a user input to at least one system of the vehicle;

wherein the actuator is configured to transition the outer surface between at least a first button arrangement including the at least one haptic button and a second button arrangement including two or more haptic buttons, wherein the first button arrangement is different from the second button arrangement;

wherein the first button arrangement and the second button arrangement are associated with different driving modes of the vehicle; and wherein the first button arrangement includes a fewer number of haptic buttons than the second button arrangement.

12. The user interface according to claim 11, wherein a group of pins of the plurality of pins in the raised position form the at least one haptic button.

13. The user interface according to claim 11, wherein the actuator is operable to move the plurality of pins to the raised position by at least a first amount or a second amount, wherein the second amount is greater than the first amount.

14. The user interface according to claim 13, wherein the first amount is approximately 3 mm and the second amount is approximately 5 mm.

15. The user interface according to claim 11, wherein the actuator is configured to move a group of pins to the raised position to form a shape of the at least one haptic button.

16. The user interface according to claim 11, wherein actuator is configured to move at least two groups of pins of the plurality of pins to form at least two different haptic buttons on the outer surface of the cover layer.

17. The user interface according to claim 16, wherein a first group of pins forms a first haptic button that is mapped for input to a first system of a plurality of systems of the vehicle and wherein a second group of pins forms a second haptic button that is mapped for input to a second system of the plurality of systems of the vehicle.

18. The user interface according to claim 11, wherein the actuator is configured to form one or more haptic buttons on the outer surface of the cover layer based on a button arrangement associated with a user profile of a user of the vehicle.

19. The user interface according to claim 18, wherein the user profile for each user of the vehicle is associated with a key and/or a user setting.

20. The user interface according to claim 11, wherein the user interface is located in a center console of an interior of the vehicle separate from a display.

* * * * *